US012774691B2

(12) United States Patent
Noel et al.

(10) Patent No.: US 12,774,691 B2
(45) Date of Patent: Oct. 27, 2026

(54) ACOUSTIC ENGINE EXHAUST CENTER BODY WITH TAPERED INNER SKIN

(71) Applicant: Rohr, Inc., Chula Vista, CA (US)

(72) Inventors: Aaron T. Noel, Poway, CA (US); Peter Aziz, San Diego, CA (US); Pratap Mallampati, Bengaluru (IN)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/999,974

(22) Filed: Dec. 23, 2024

(65) Prior Publication Data

US 2025/0207542 A1 Jun. 26, 2025

(30) Foreign Application Priority Data

Dec. 22, 2023 (IN) ............................ 202311088186

(51) Int. Cl.

*F02K 1/44* (2006.01)
*F02K 1/04* (2006.01)
*F02K 1/82* (2006.01)

(52) U.S. Cl.

CPC .................. *F02K 1/44* (2013.01); *F02K 1/04* (2013.01); *F02K 1/827* (2013.01)

(58) Field of Classification Search

CPC ..... F02K 1/04; F02K 1/78; F02K 1/80; F02K 1/82; F02K 1/827; F02K 1/44; F05D 2260/963; F05D 2250/232

See application file for complete search history.

(56) References Cited

U.S. PATENT DOCUMENTS 7,784,283 B2 8/2010 Yu
8,479,877 B2 7/2013 Todorovic
8,776,946 B2 7/2014 Todorovic
9,261,008 B2 2/2016 Mecuson (Continued)

FOREIGN PATENT DOCUMENTS

FR 3116306 A1 * 5/2022 ............ F02K 1/827
FR 3114848 B1 11/2023
WO 2022123142 A1 6/2022

OTHER PUBLICATIONS

English translation of FR 3116306 (Year: 2022).*
EP Search Report for EP Patent Application No. 24223101.7 dated Apr. 11, 2025.

*Primary Examiner* — Thomas P Burke
(74) *Attorney, Agent, or Firm* — Getz Balich LLC

(57) ABSTRACT

An assembly for an aircraft propulsion system includes an exhaust center body. The exhaust center body includes an inner skin, a perforated outer skin, a first bulkhead, a second bulkhead and an acoustic chamber. The inner skin extends circumferentially about an axis. The inner skin extends axially along the axis between and connected to the first bulkhead and the second bulkhead. A radius from the axis to the inner skin changes as the inner skin extends axially along the axis. The perforated outer skin extends circumferentially about the inner skin. The perforated outer skin extends axially along the axis between and is connected to the first bulkhead and the second bulkhead. The acoustic chamber extends axially uninterrupted within the exhaust center body between the first bulkhead and the second bulkhead. The acoustic chamber extends radially within the exhaust center body between the inner skin and the perforated outer skin.

17 Claims, 8 Drawing Sheets

(56) References Cited

U.S. PATENT DOCUMENTS

| | | | | |
|---|---|---|---|---|
| 11,136,942 | B2 | 10/2021 | Lopez | |
| 11,428,191 | B1 * | 8/2022 | Alonso-Miralles ....... | F02K 1/80 |
| 2004/0076512 | A1 * | 4/2004 | Lata Perez ................ | F02C 7/24<br>415/119 |
| 2007/0256889 | A1 * | 11/2007 | Yu ............................. | F02K 1/04<br>181/214 |
| 2015/0034412 | A1 * | 2/2015 | Mecuson ................ | F01D 25/30<br>181/256 |
| 2020/0088135 | A1 * | 3/2020 | Lopez .................. | G10K 11/172 |
| 2020/0386187 | A1 * | 12/2020 | Kelford ..................... | B32B 3/12 |
| 2024/0159202 | A1 * | 5/2024 | Koroly ...................... | F02C 7/24 |

* cited by examiner

ACOUSTIC ENGINE EXHAUST CENTER BODY WITH TAPERED INNER SKIN

This application claims priority to Indian Patent Appln. No. 202311088186 filed Dec. 22, 2023, which is hereby incorporated herein by reference in its entirety.

BACKGROUND

1. Technical Field

This disclosure relates generally to an aircraft propulsion system and, more particularly, to sound attenuation for the aircraft propulsion system.

2. Background Information

An aircraft propulsion system directs combustion products through an exhaust outlet between an exhaust nozzle and an exhaust center body. Sound waves (e.g., noise) generated during propulsion system operation may travel with the combustion products out through the exhaust outlet. Some exhaust center bodies are configured with structures for attenuating these sound waves. While known sound attenuating structures have various advantages, there is still room in the art for improvement. In particular, there is a need in the art for sound attenuation structures capable of attenuating low frequency sound waves while maintaining structural integrity.

SUMMARY OF THE DISCLOSURE

According to an aspect of the present disclosure, an assembly is provided for an aircraft propulsion system. This assembly includes an exhaust center body. The exhaust center body includes an inner skin, a perforated outer skin, a first bulkhead, a second bulkhead and an acoustic chamber. The inner skin extends circumferentially about an axis. The inner skin extends axially along the axis between and connected to the first bulkhead and the second bulkhead. A radius from the axis to the inner skin changes as the inner skin extends axially along the axis. The perforated outer skin extends circumferentially about the inner skin. The perforated outer skin extends axially along the axis between and is connected to the first bulkhead and the second bulkhead. The acoustic chamber extends axially uninterrupted within the exhaust center body between the first bulkhead and the second bulkhead. The acoustic chamber extends radially within the exhaust center body between the inner skin and the perforated outer skin.

According to another aspect of the present disclosure, another assembly is provided for an aircraft propulsion system. This assembly includes an exhaust center body. The exhaust center body includes an inner skin, a perforated outer skin, a first bulkhead, a second bulkhead, an acoustic chamber and a tail cone. The inner skin extends circumferentially about an axis. The inner skin extends axially along the axis between and is connected to the first bulkhead and the second bulkhead. The inner skin radially tapers towards the axis as the inner skin extends axially along the axis from the first bulkhead to the second bulkhead. The perforated outer skin extends circumferentially about the inner skin. The perforated outer skin extends axially along the axis between and is connected to the first bulkhead and the second bulkhead. The first bulkhead is located axially between the second bulkhead and the tail cone along the axis. The acoustic chamber extends axially within the exhaust center body between the first bulkhead and the second bulkhead. The acoustic chamber extends radially within the exhaust center body between the inner skin and the perforated outer skin.

According to still another aspect of the present disclosure, another assembly is provided for an aircraft propulsion system. This assembly includes an exhaust center body. The exhaust center body includes an inner skin, a perforated outer skin, a first bulkhead, a second bulkhead, a first baffle and an acoustic chamber. The inner skin extends circumferentially about an axis. The inner skin extends axially along the axis between and is connected to the first bulkhead and the second bulkhead. The inner skin radially tapers towards the axis as the inner skin extends axially along the axis from the first bulkhead to the second bulkhead. The perforated outer skin extends circumferentially about the inner skin. The perforated outer skin extends axially along the axis between and is connected to the first bulkhead and the second bulkhead. The first baffle extends axially along the axis between and is connected to the first bulkhead and the second bulkhead. The first baffle extends radially between the inner skin and the perforated outer skin. The first baffle is connected to the inner skin. The acoustic chamber extends axially within the exhaust center body between the first bulkhead and the second bulkhead. The acoustic chamber extends radially within the exhaust center body between the inner skin and the perforated outer skin. The acoustic chamber extends circumferentially within the exhaust center body to the first baffle.

The acoustic chamber may extend axially uninterrupted within the exhaust center body from the first bulkhead to the second bulkhead. The acoustic chamber may extend radially uninterrupted within the exhaust center body from the inner skin to the perforated outer skin.

The radius from the axis to the inner skin may decrease as the inner skin extends axially along the axis from the first bulkhead to the second bulkhead.

The first bulkhead may be axially aft and downstream of the second bulkhead along the axis.

The second bulkhead may be axially aft and downstream of the first bulkhead along the axis.

The exhaust center body may also include a tail cone. The first bulkhead may be axially between the second bulkhead and the tail cone along the axis.

The exhaust center body may also include a tail cone. The second bulkhead may be axially between the first bulkhead and the tail cone along the axis.

The inner skin may include a frustoconical surface which forms an inner peripheral boundary of the acoustic chamber.

The acoustic chamber may have an axial length along the axis. The inner skin may have an axial length along the axis that is at least fifty percent of the axial length of the acoustic chamber.

An axial distance between the first bulkhead and the second bulkhead may change as the acoustic chamber extends from the perforated outer skin to the inner skin.

The first bulkhead may include a frustoconical first surface which forms a first side peripheral boundary of the acoustic chamber.

The second bulkhead may include a frustoconical second surface which forms a second side peripheral boundary of the acoustic chamber.

An inner end of the first bulkhead may be located axially between an outer end of the first bulkhead and the inner skin along the axis. An inner end of the second bulkhead may be located axially between an outer end of the second bulkhead and the inner skin along the axis.

The exhaust center body may also include a first baffle. The first baffle may extend radially between the inner skin and the perforated outer skin. The first baffle may extend axially between the first bulkhead and the second bulkhead. The acoustic chamber may extend circumferentially within the exhaust center body to the first baffle.

The exhaust center body may also include a second baffle. The second baffle may extend radially between the inner skin and the perforated outer skin. The second baffle may extend axially between the first bulkhead and the second bulkhead. The acoustic chamber may extend circumferentially within the exhaust center body between the first baffle and the second baffle.

The exhaust center body may also include a stiffener mounted to the first baffle. The stiffener may extend along the first baffle following a straight trajectory.

The exhaust center body may also include a stiffener mounted to the first baffle. The stiffener may extend along the first baffle following a non-straight trajectory.

An axial first end of the first baffle may be connected to the first bulkhead by a first end bracket. The first end bracket may extend along at least eighty percent of a longitudinal length of the axial first end of the first baffle. In addition or alternatively, an axial second end of the first baffle may be connected to the second bulkhead by a second end bracket. The second end bracket may extend along at least eighty percent of a longitudinal length of the axial second end of the first baffle.

A radial inner side of the first baffle may be connected to the inner skin by an inner side bracket. The inner side bracket may extend along at least eighty percent of a longitudinal length of the radial inner side of the first baffle.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
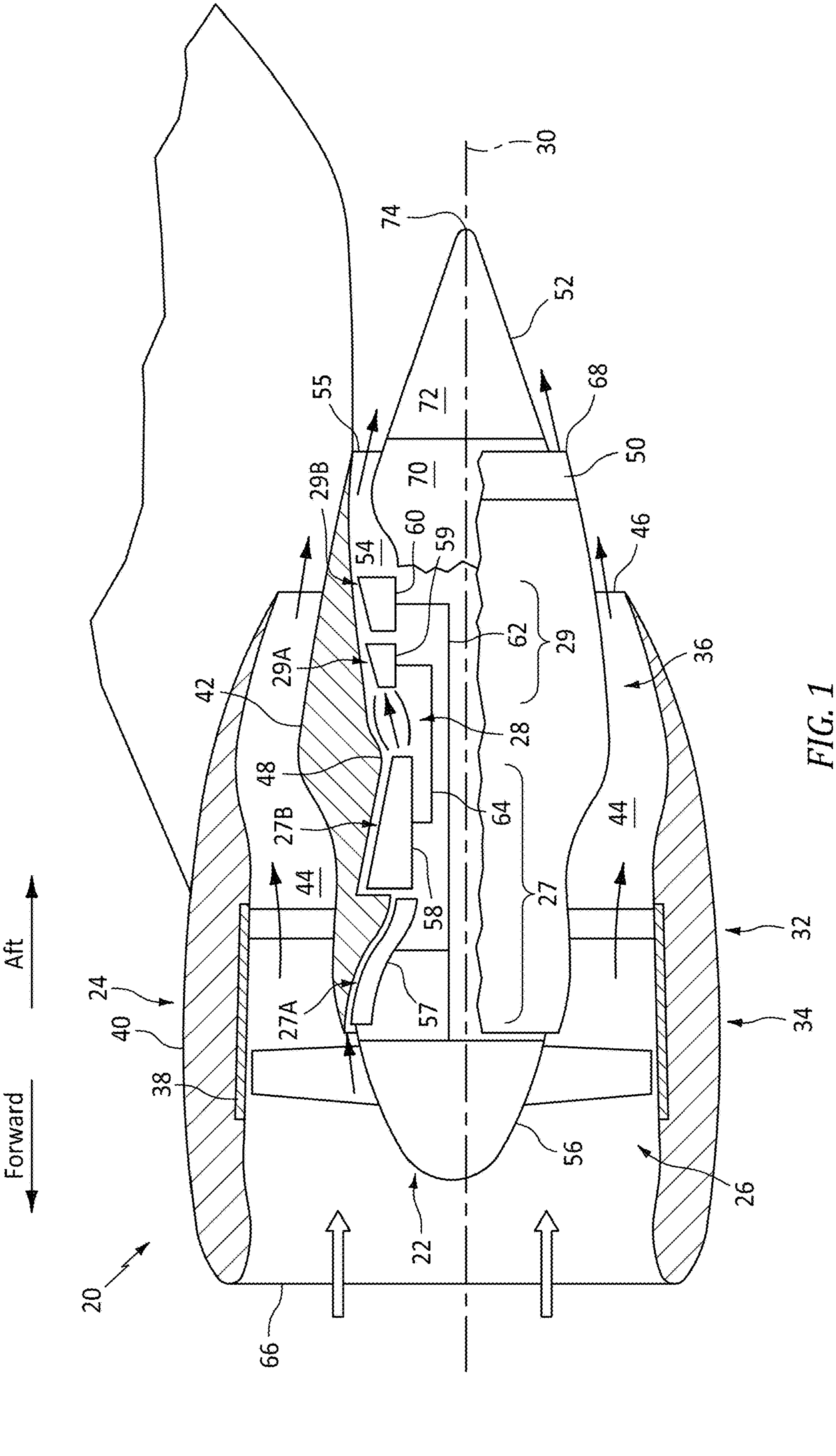
FIG. 1 is a side cutaway schematic illustration of an aircraft propulsion system.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axis 30 (e.g., an axial centerline, a rotational axis, etc.) of the gas turbine engine 22 within an aircraft propulsion system housing 32. This housing 32 includes an outer housing structure 34 and an inner housing structure 36.

The outer housing structure 34 includes an outer case 38 (e.g., a fan case, a containment case, etc.) and an outer structure 40 of the nacelle 24; e.g., an outer nacelle structure. The outer case 38 houses at least the fan section 26. The outer nacelle structure 40 houses and provides an aerodynamic cover over the outer case 38. The outer nacelle structure 40 also covers a portion of an inner structure 42 of the nacelle 24; e.g., an inner nacelle structure, which may also be referred to as an inner fixed structure. More particularly, the outer nacelle structure 40 axially overlaps and extends circumferentially about (e.g., completely around) the inner nacelle structure 42. The outer nacelle structure 40 and the inner nacelle structure 42 thereby at least partially or completely form a bypass flowpath 44. This bypass flowpath 44 extends axially along the axis 30 within the aircraft propulsion system 20 to a bypass exhaust 46, where the bypass flowpath 44 is radially between the nacelle structures 34 and 36.

The inner housing structure 36 includes an inner case 48 (e.g., a core case) and the inner nacelle structure 42. The inner case 48 houses one or more of the engine sections 27A-29B, where at least (or only) the engine sections 27A-29B may collectively form a core of the gas turbine engine 22. The inner nacelle structure 42 houses and provides an aerodynamic cover for the inner case 48. A downstream/aft portion of the inner housing structure 36 such as, for example, a (e.g., tubular) core exhaust nozzle 50 of the inner nacelle structure 42 also covers at least a portion of an (e.g., conical) exhaust center body 52. More particularly, the inner nacelle structure 42 and its exhaust nozzle 50 axially overlap and extend circumferentially about (e.g., completely around) the exhaust center body 52. The exhaust nozzle 50 and the exhaust center body 52 thereby collectively form a downstream/aft portion of a core flowpath 54; e.g., an annular flowpath. This core flowpath 54 extends axially within the aircraft propulsion system 20, sequentially through the engine sections 27A-29B (e.g., the engine core), to a core exhaust 55 at a downstream/aft end of the aircraft propulsion system 20.

Each of the engine sections 26, 27A, 27B, 29A and 29B of FIG. 1 includes a respective bladed engine rotor 56-60. Each of these bladed engine rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The engine shafts 62 and 64 are rotatably supported by a plurality of bearings (not shown). Each of these bearings is connected to the aircraft propulsion system housing 32 by at least one stationary structure such as, for example, an annular support frame.

During operation, air enters the aircraft propulsion system 20 through an airflow inlet 66. This air is directed through the fan section 26 and into the core flowpath 54 and the bypass flowpath 44. The air entering the core flowpath 54 may be referred to as core air. The air within the bypass flowpath 44 may be referred to as bypass air.

The core air is compressed by the LPC rotor 57 and the HPC rotor 58 and directed into a combustion chamber of a combustor in the combustor section 28. Fuel is injected into the combustion chamber and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 and the LPT rotor 60 respectively drive rotation of the HPC rotor 58 and the LPC rotor 57 and, thus, compression of the air received from a core airflow inlet. The rotation of the LPT rotor 60 also drives rotation of the fan rotor 56, which propels the bypass air through the bypass flowpath 44 and out of the aircraft propulsion system 20. The propulsion of the bypass air may account for a majority of thrust generated by the gas turbine engine 22. The aircraft propulsion system 20 of the present disclosure, however, is not limited to the exemplary gas turbine engine configuration described above as discussed below in further detail.

The core exhaust nozzle 50 of FIG. 1 is connected to a component of the inner housing structure 36 such as a turbine exhaust case (TEC). The core exhaust nozzle 50 projects axially out from the turbine exhaust case to a trailing edge 68 of the core exhaust nozzle 50. The core exhaust nozzle 50 thereby axially overlaps at least an upstream, forward section 70 of the exhaust center body 52; e.g., an acoustic forward center body assembly. The core exhaust nozzle 50 also extends circumferentially about (e.g., completely around) the axis 30, thereby circumscribing the exhaust center body 52 and its center body section 70.

The exhaust center body 52 of FIG. 1 includes the center body section 70 and a downstream, aft exhaust tail cone section 72 (e.g., an exhaust tail cone). The exhaust center body 52 and its center body section 70 are connected to a component of the housing structure 36 such as the turbine exhaust case. The center body section 70 projects axially out from the turbine exhaust case to the tail cone section 72. The tail cone section 72 is connected to the center body section 70, and projects axially to a downstream, aft tip 74 of the exhaust center body 52 and its tail cone section 72. The tail cone section 72 of FIG. 1 is axially downstream, aft of the exhaust nozzle trailing edge 68; however, the present disclosure is not limited to such an exemplary arrangement.

Figure 2:
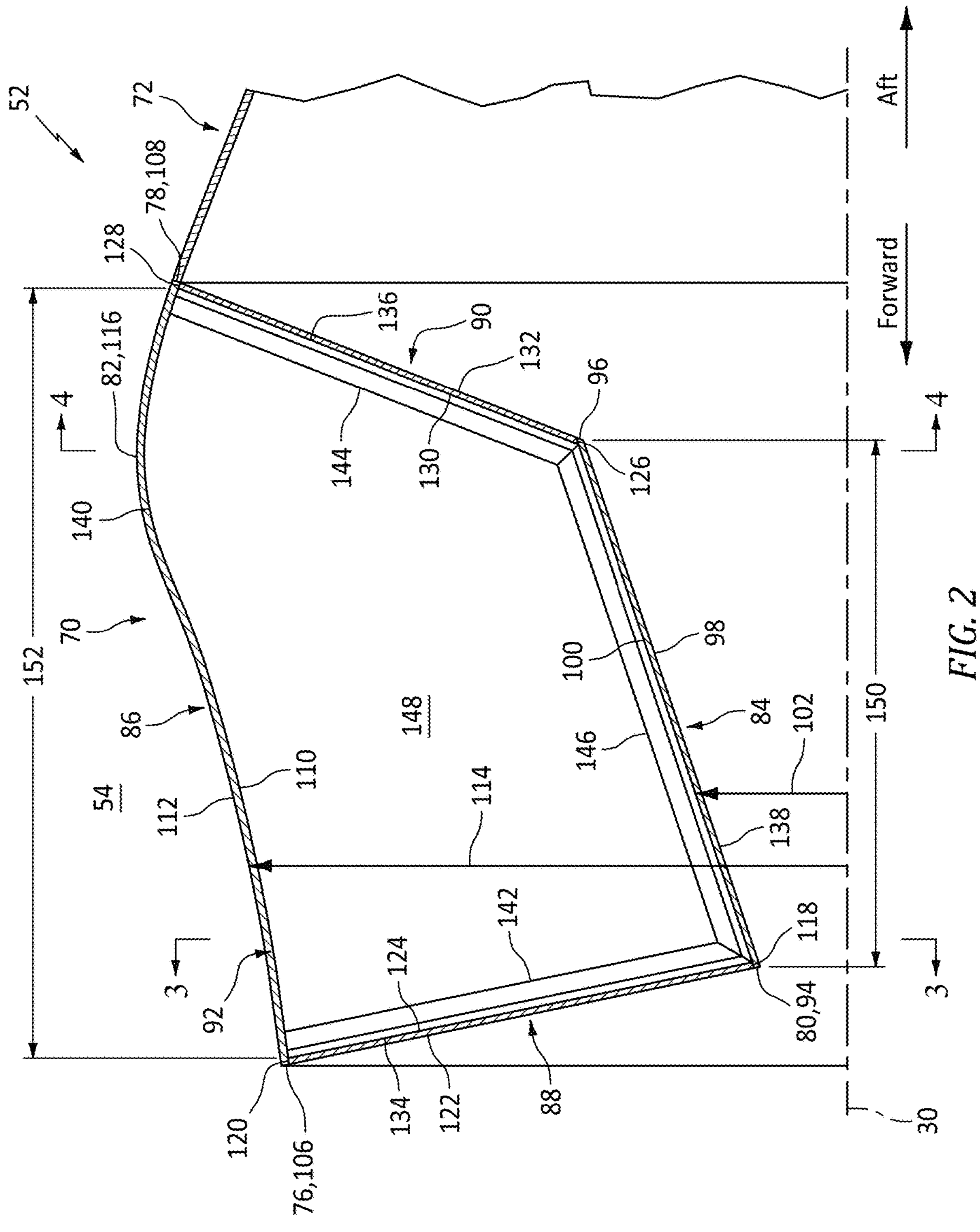
FIG. 2 is a partial side sectional illustration of a section of an exhaust center body.
Figure 3:
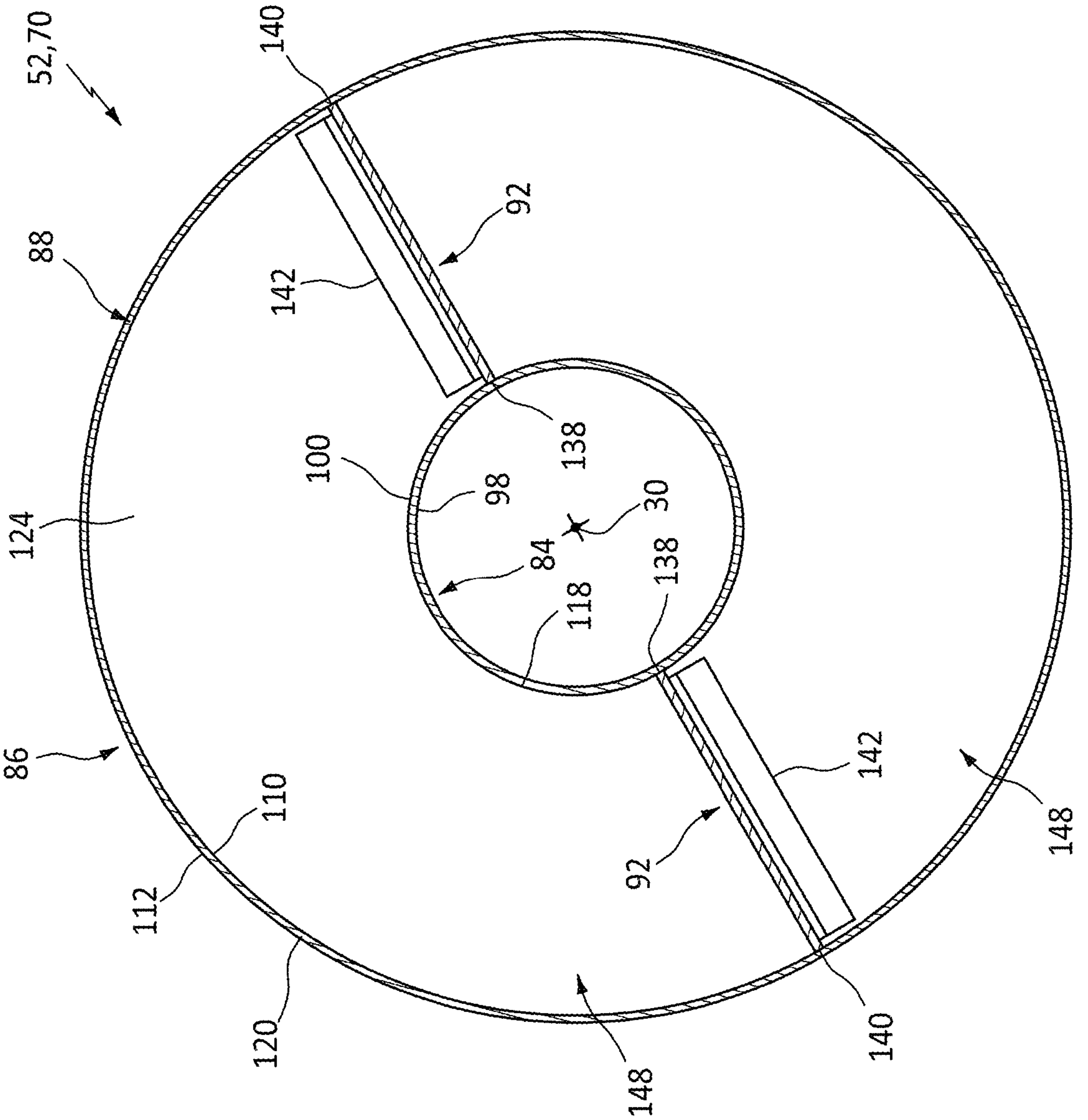
FIG. 3 is a cross-sectional illustration of the center body section taken along line 3-3 in FIG. 2.
Figure 4:
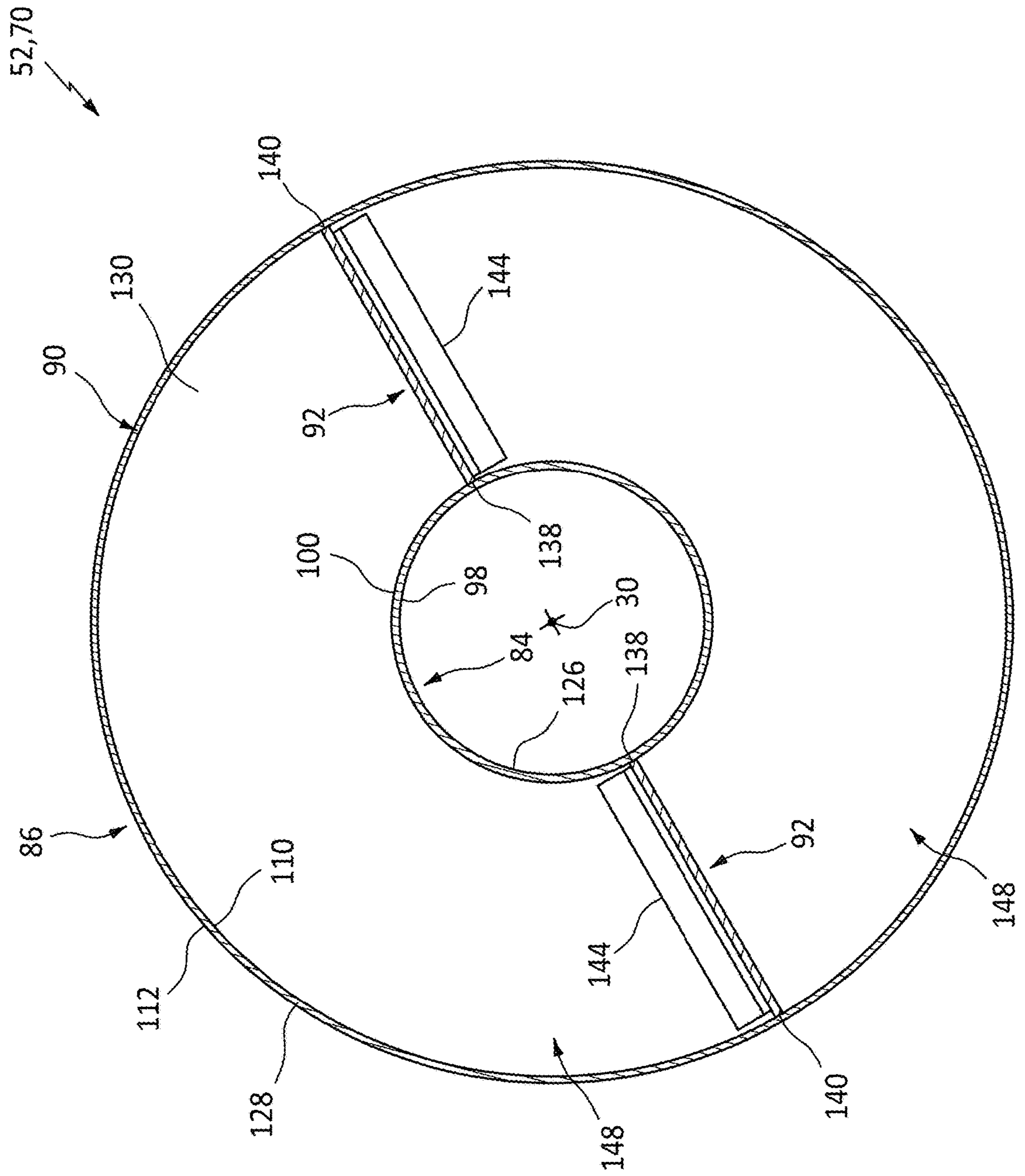
FIG. 4 is a cross-sectional illustration of the center body section taken along line 4-4 in FIG. 2.

Referring to FIG. 2, the center body section 70 extends axially along the axis 30 from an upstream, forward end 76 of the exhaust center body 52 and its center body section 70 to a downstream, aft end 78 of the center body section 70. The center body section 70 extends radially (in a direction away from the axis 30) from an inner side 80 of the exhaust center body 52 and its center body section 70 to an outer side 82 of the exhaust center body 52 and its center body section 70. Referring to FIGS. 3 and 4, the exhaust center body 52 and its center body section 70 extend circumferentially about (e.g., completely around) the axis 30. The center body section 70 may thereby have a full-hoop tubular geometry. Referring to FIGS. 2, 3 and 4, the exhaust center body 52 and its center body section 70 include an inner skin 84, a perforated outer skin 86, an upstream, forward bulkhead 88 and a downstream, aft bulkhead 90. The exhaust center body 52 and its center body section 70 may also include one or more baffles 92.

Referring to FIG. 2, the inner skin 84 may be configured as a relatively thin sheet or layer of continuous and uninterrupted material; e.g., non-perforated material. The inner skin 84 of FIG. 2 extends axially along the axis 30 from an upstream, forward end 94 of the inner skin 84 to a downstream, aft end 96 of the inner skin 84. This inner skin 84 of FIG. 2 also extend radially between the inner skin forward end 94 and the inner skin aft end 96. The inner skin 84 has a thickness which extends (e.g., radially) between and to radially opposing surfaces 98 and 100 of the inner skin 84. Referring to FIGS. 3 and 4, the inner skin 84 extends circumferentially about (e.g., completely around) the axis 30. The inner skin 84 may thereby have a full-hoop (e.g., tubular) geometry. The inner skin 84 and its inner skin surfaces 98 and 100 of FIGS. 3 and 4, for example, have a circular cross-sectional geometry when viewed, for example, in a first reference plane perpendicular to the axis 30.

Figure 5:
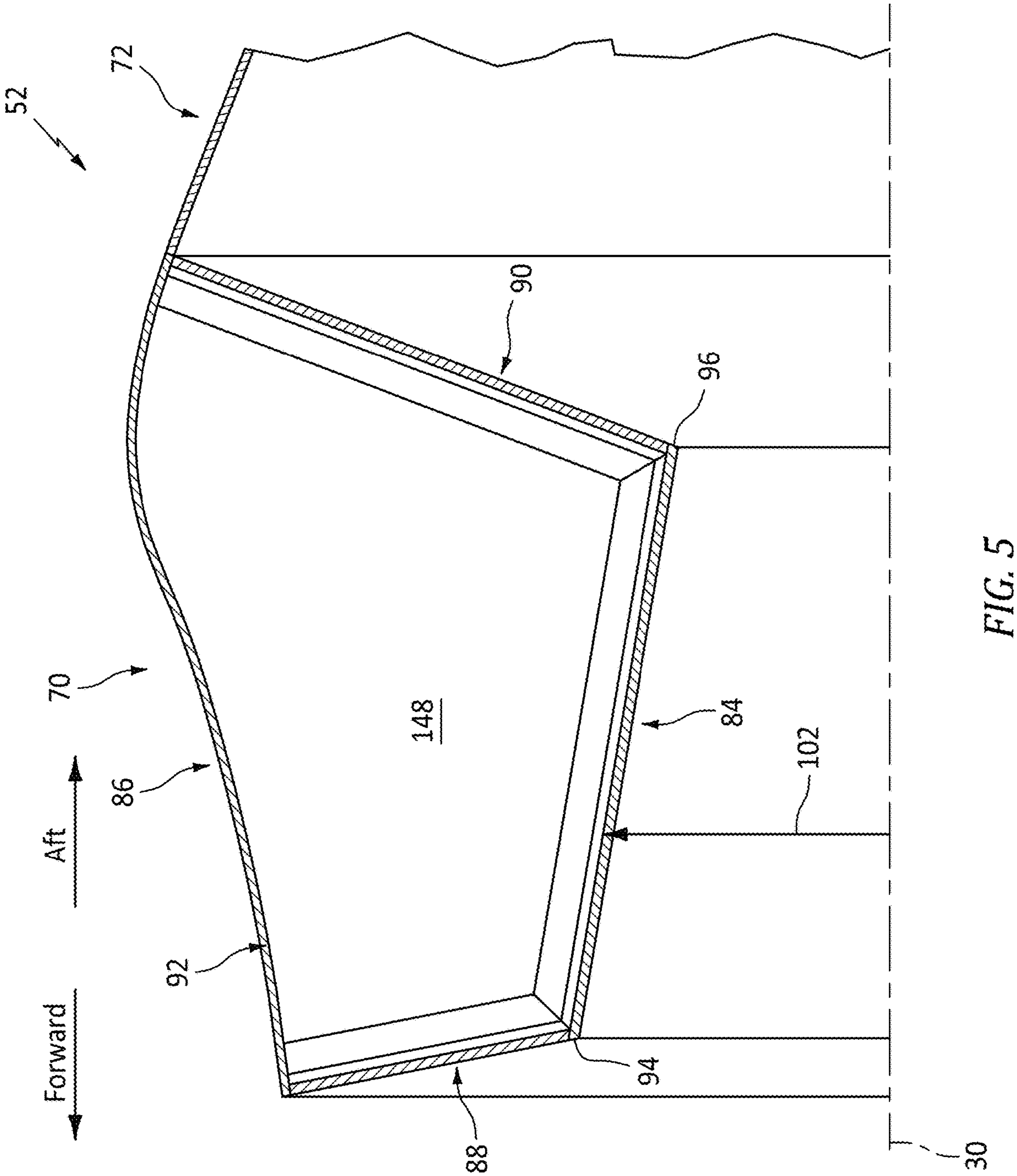
FIG. 5 is a partial side sectional illustration of a section of the exhaust center body with another inner skin arrangement.

Referring to FIG. 2, the inner skin 84 has a radius 102 measured from the axis 30 to, for example, the inner skin outer surface 100. This inner skin radius 102 continuously or incrementally changes as the inner skin 84 and its inner skin outer surface 100 extend axially along the axis 30 between its inner skin forward end 94 and its inner skin aft end 96. The inner skin radius 102 of FIG. 2, for example, decreases as the inner skin 84 and its inner skin outer surface 100 extend axially along the axis 30 from (or about) the inner skin aft end 96 to (or about) the inner skin forward end 94. The inner skin radius 102 at the inner skin forward end 94 is thereby less than the inner skin radius 102 at the inner skin aft end 96. With this arrangement, at least a portion or an entirety the inner skin 84 radially tapers as the inner skin 84 extends axially along the axis 30 in an upstream, forward direction. At least a portion or the entirety of the inner skin outer surface 100 may have a frustoconical geometry. At least a portion or the entirety of the inner skin outer surface 100 may have a straight-line sectional geometry when viewed, for example, in a second reference plane parallel with (e.g., coincident with, including, etc.) the axis 30. The present disclosure, however, is not limited to the foregoing exemplary arrangement. For example, referring to FIG. 5, the inner skin 84 may alternatively radially taper as the inner skin 84 extends axially along the axis 30 in a downstream, aft direction. With the tapering geometry of FIG. 2 or 5, a strength and/or a rigidity of the inner skin 84 of the present disclosure may be increased compared to, for example, a similarly situated inner skin with a cylindrical geometry.

The outer skin 86 may be configured as a relatively thin sheet or layer of material with one or more perforations 104 (see FIG. 6); e.g., apertures such as through holes. The outer skin 86 of FIG. 2 extends axially along the axis 30 from an upstream, forward end 106 of the outer skin 86 to a downstream, aft end 108 of the outer skin 86. The outer skin forward end 106 of FIG. 2 is spaced axially upstream, forward of the inner skin forward end 94. The outer skin aft end 108 of FIG. 2 is spaced axially downstream, aft of the inner skin aft end 96. However, referring to FIG. 7, the inner skin and the outer skin axial ends 94 and 106, 96 and 108 may alternatively be axially aligned along the axis 30 in other embodiments. Referring again to FIG. 2, the outer skin 86 has a thickness which extends (e.g., radially) between and to radially opposing surfaces 110 and 112 of the outer skin 86. Referring to FIGS. 3 and 4, the outer skin 86 extends circumferentially about (e.g., completely around) the axis 30. The outer skin 86 may thereby have a full-hoop (e.g., tubular) geometry. The outer skin 86 and its outer skin surfaces 110 and 112 of FIGS. 3 and 4, for example, have a circular cross-sectional geometry when viewed, for example, in the first reference plane. The outer skin 86 is also disposed radially outboard of the inner skin 84 and thereby extends circumferentially about (e.g., circumscribes) the inner skin 84, where the outer skin inner surface 110 radially faces the inner skin outer surface 100.

Referring to FIG. 2, the outer skin 86 has a radius 114 measured from the axis 30 to, for example, the outer skin outer surface 112. This outer skin outer surface 112 continuously or incrementally changes as the outer skin 86 and its outer skin outer surface 112 extend axially along the axis 30 between its outer skin forward end 106 and its outer skin aft end 108. The outer skin radius 114 of FIG. 2, for example, increases and then decreases as the outer skin 86 and its outer skin outer surface 112 extend axially along the axis 30 from (or about) the outer skin aft end 108 to (or about) the outer skin forward end 106. The outer skin radius 114 at the outer skin forward end 106 may be less than the outer skin radius 114 at the outer skin aft end 108. The outer skin radius 114 at an intermediate location 116 axially along the axis 30 (e.g., towards the outer skin aft end 108) is greater than the outer skin radius 114 at each outer skin end 106, 108. With this arrangement, an upstream, forward portion of the outer skin 86 radially tapers as the outer skin 86 extends from (or about) the intermediate location 116 to (or about) the outer skin forward end 106. A downstream, aft portion of the outer skin 86 radially tapers as the outer skin 86 extends from (or about) the intermediate location 116 to (or about) the outer skin aft end 108. At least a portion or an entirety of the outer skin 86 may have a non-straight-line (e.g., curved, undulating, splined, arcuate, etc.) sectional geometry when viewed, for example, in the second reference plane. The present disclosure, however, is not limited to the foregoing exemplary arrangement.

Figure 6:
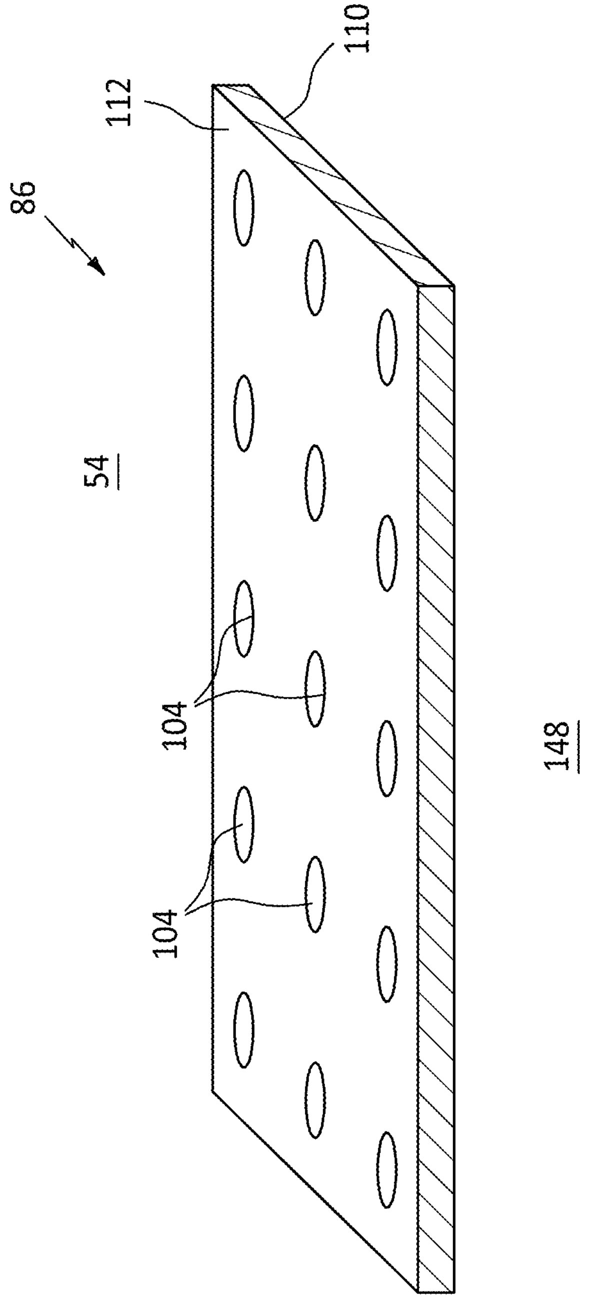
FIG. 6 is a perspective illustration of a portion of a perforated outer skin.
Figure 7:
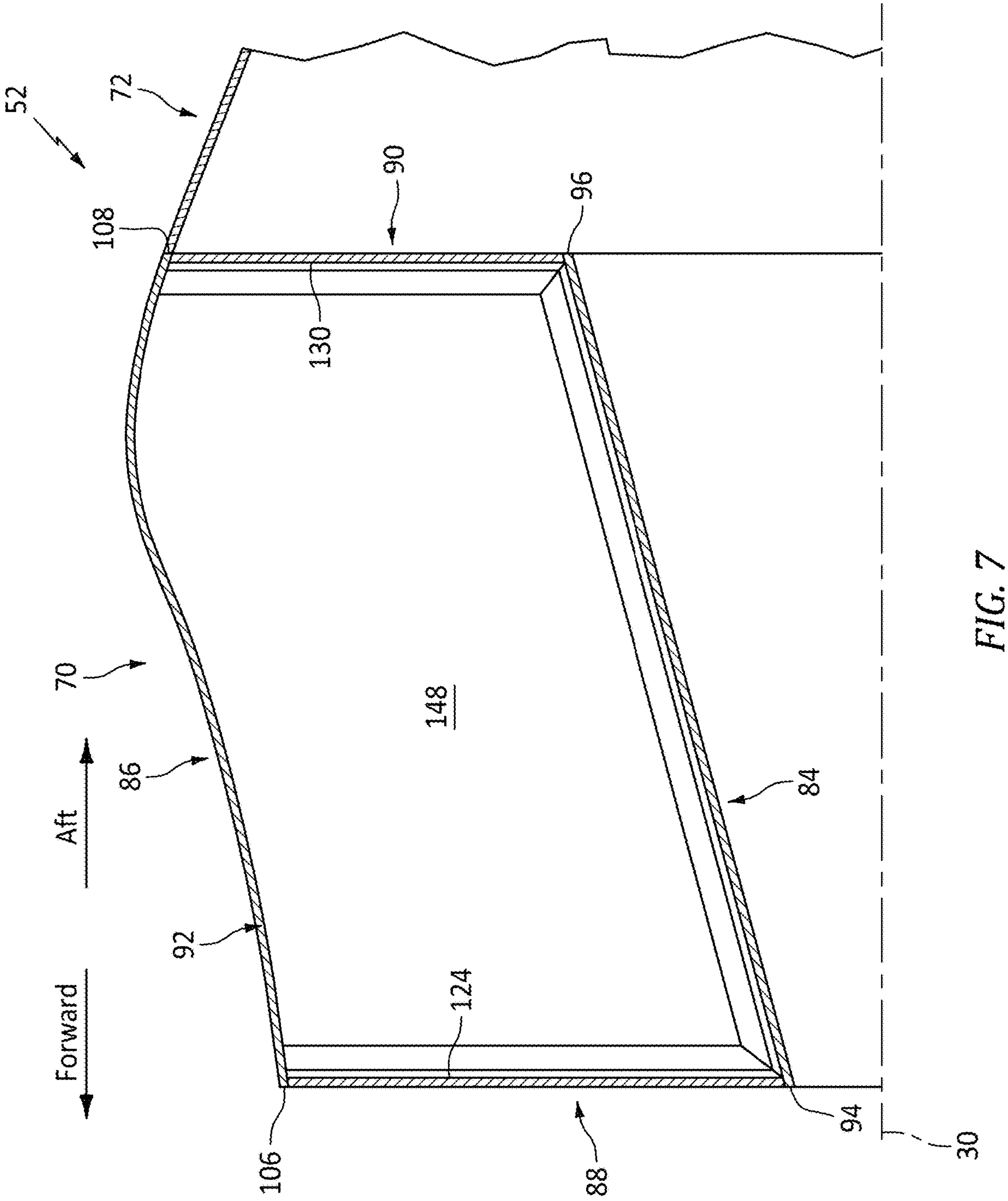
FIG. 7 is a partial side sectional illustration of a section of the exhaust center body with another bulkhead arrangement.

Referring to FIG. 6, the perforations 104 are distributed axially along and/or circumferentially about the axis 30 (see FIGS. 2-4). Each of the perforations 104 extends vertically (e.g., radially and/or in a direction perpendicular to the outer skin surfaces 110 and 112) through the outer skin 86 between the opposing outer skin surfaces 110 and 112.

Referring to FIG. 2, the forward bulkhead 88 may be configured as a relatively thin sheet or layer of continuous and uninterrupted material; e.g., non-perforated material. The forward bulkhead 88 of FIG. 2 extends radially from an inner end 118 of the forward bulkhead 88 to an outer end 120 of the forward bulkhead 88. The forward bulkhead 88 of FIG. 2 also extends axially between the forward bulkhead inner end 118 and the forward bulkhead outer end 120. The forward bulkhead outer end 120 of FIG. 2, for example, is also an axial upstream, forward end of the forward bulkhead 88. The forward bulkhead inner end 118 of FIG. 2 is also an axial downstream, aft end of the forward bulkhead 88. The forward bulkhead 88 has a thickness which extends (e.g., axially) between and to axially opposing surfaces 122 and 124 of the forward bulkhead 88. Referring to FIG. 3, the forward bulkhead 88 extends circumferentially about (e.g., completely around) the axis 30. The forward bulkhead 88 may thereby have a full-hoop (e.g., tubular) geometry. At least a portion or an entirety of the forward bulkhead aft surface 124 may have a frustoconical geometry. Referring to FIG. 2, at least a portion or the entirety of the forward bulkhead aft surface 124 may have a straight-line sectional geometry when viewed, for example, in the second reference plane. The present disclosure, however, is not limited to the foregoing exemplary arrangement. For example, referring to FIG. 7, the forward bulkhead aft surface 124 may alternatively be an annular, planar surface.

Referring to FIG. 2, the forward bulkhead 88 extends radially between and is connected to the inner skin 84 and the outer skin 86. The forward bulkhead 88 of FIG. 2 at (e.g., on, adjacent or proximate) its forward bulkhead inner end 118, for example, is mechanically fastened, bonded and/or otherwise attached to the inner skin 84 at its inner skin forward end 94. The forward bulkhead 88 of FIG. 2 at its forward bulkhead outer end 120 is mechanically fastened, bonded and/or otherwise attached to the outer skin 86 at its outer skin forward end 106. With this arrangement, the forward bulkhead inner end 118 is located axially between the forward bulkhead outer end 120 and the inner skin 84 and its inner skin forward end 94. The forward bulkhead 88 of FIG. 2 thereby radially tapers as the forward bulkhead 88 extends axially in the downstream, aft direction from (or about) the outer skin 86 to (or about) the inner skin 84.

The aft bulkhead 90 may be configured as a relatively thin sheet or layer of continuous and uninterrupted material; e.g., non-perforated material. The aft bulkhead 90 of FIG. 2 extends radially from an inner end 126 of the aft bulkhead 90 to an outer end 128 of the aft bulkhead 90. The aft bulkhead 90 of FIG. 2 also extends axially between the aft bulkhead inner end 126 and the aft bulkhead outer end 128. The aft bulkhead outer end 128 of FIG. 2, for example, is also an axial downstream, aft end of the aft bulkhead 90. The aft bulkhead inner end 126 of FIG. 2 is also an axial upstream, forward end of the aft bulkhead 90. The aft bulkhead 90 has a thickness which extends (e.g., axially) between and to axially opposing surfaces 130 and 132 of the aft bulkhead 90. Referring to FIG. 4, the aft bulkhead 90 extends circumferentially about (e.g., completely around) the axis 30. The aft bulkhead 90 may thereby have a full-hoop (e.g., tubular) geometry. At least a portion or an entirety of the aft bulkhead forward surface 130 may have a frustoconical geometry. Referring to FIG. 2, at least a portion or the entirety of the aft bulkhead forward surface 130 may have a straight-line sectional geometry when viewed, for example, in the second reference plane. The present disclosure, however, is not limited to the foregoing exemplary arrangement. For example, referring to FIG. 5, the aft bulkhead forward surface 130 may alternatively be an annular, planar surface.

The aft bulkhead 90 extends radially between and is connected to the inner skin 84 and the outer skin 86. The aft bulkhead 90 of FIG. 2 at its aft bulkhead inner end 126, for example, is mechanically fastened, bonded and/or otherwise attached to the inner skin 84 at its inner skin aft end 96. The aft bulkhead 90 of FIG. 2 at its aft bulkhead outer end 128 is mechanically fastened, bonded and/or otherwise attached to the outer skin 86 at its outer skin aft end 108. With this arrangement, the aft bulkhead inner end 126 is located axially between the aft bulkhead outer end 128 and the inner skin 84 and its inner skin aft end 96. The aft bulkhead 90 of FIG. 2 thereby radially tapers as the aft bulkhead 90 extends axially in the upstream, forward direction from (or about) the outer skin 86 to (or about) the inner skin 84.

Each baffle 92 extends axially along the axis 30 between and to an upstream, forward end 134 of the respective baffle 92 and a downstream, aft end 136 of the respective baffle 92. Each baffle 92 extends radially between and to an inner side 138 of the respective baffle 92 and an outer side 140 of the respective baffle 92.

Each baffle 92 extends axially between and is connected to the forward bulkhead 88 and the aft bulkhead 90. Each baffle 92 at its baffle forward end 134, for example, is mechanically fastened, bonded and/or otherwise attached to the forward bulkhead 88 through a forward end bracket 142. This forward end bracket 142 may extend longitudinally along at least eighty percent (80%) or ninety percent (90%) or an entirety of a longitudinal length of the respective baffle 92 at/along its baffle forward end 134. Each baffle 92 at its at its baffle aft end 136 is mechanically fastened, bonded and/or otherwise attached to the aft bulkhead 90 through an aft end bracket 144. This aft end bracket 144 may extend longitudinally along at least eighty percent (80%) or ninety percent (90%) or an entirety of a longitudinal length of the respective baffle 92 at/along its baffle aft end 136. With the arrangement of FIG. 2, each baffle 92 may form a structure web between the forward bulkhead 88 and the aft bulkhead 90/a stiffening rib along each bulkhead 88, 90.

Each baffle 92 extends radially between the inner skin 84 and the outer skin 86. The baffle inner side 138, for example, may be disposed adjacent and/or may engage (e.g., contact) the inner skin outer surface 100. The baffle outer side 140 may be disposed adjacent and/or may engage the outer skin inner surface 110. In addition, each baffle 92 at its baffle inner side 138 is mechanically fastened, bonded and/or otherwise attached to the inner skin 84 through an inner side bracket 146. This inner side bracket 146 may extend longitudinally along at least eighty percent (80%) or ninety percent (90%) or an entirety of a longitudinal length of the respective baffle 92 at/along its baffle inner side 138. With the arrangement of FIG. 2, each baffle 92 may form a stiffening rib along the inner skin 84.

Referring to FIGS. 3 and 4, the baffles 92 are distributed circumferentially about the axis 30. The baffles 92 of FIGS. 3 and 4, for example, may be diametrically opposed. With this arrangement, the baffles 92 separate (e.g., fluidly decouple, acoustically divide, etc.) an annulus within the exhaust center body 52 and its center body section 70 into a plurality of acoustic chambers 148. Referring to FIG. 2, each of these acoustic chambers 148 extends axially within the center body section 70 along the inner skin 84 and the outer skin 86 (and the respective baffles 92) between and to the forward bulkhead 88 and the aft bulkhead 90. The forward bulkhead aft surface 124 and the aft bulkhead forward surface 130 thereby form peripheral end boundaries of each acoustic chamber 148. Referring to FIGS. 3 and 4, each of the acoustic chambers 148 extends radially within the center body section 70 along the forward bulkhead 88 and the aft bulkhead 90 (and the respective baffles 92) between and to the inner skin 84 and the outer skin 86. The inner skin outer surface 100 and the outer skin inner surface 110 thereby form peripheral side boundaries of each acoustic chamber 148. Each of the acoustic chambers 148 extends circumferentially within the center body section 70 along the center body members 84, 86, 88 and 90 between and to a respective neighboring (e.g., circumferentially adjacent) pair of the baffles 92. Each of the acoustic chambers 148 is fluidly coupled to the core flowpath 54 (e.g., an environment external to the exhaust center body 52) by the outer skin perforations 104 (see FIG. 6). Each of the acoustic chambers 148 may thereby attenuate sound (e.g., noise) propagating through the core flowpath 54 using known acoustic attenuation principals. The center body section 70 of FIGS. 2-4, in particular, may be configured as an acoustic deep cavity structure.

Referring to FIG. 2, the inner skin 84 has an axial length 150. This inner skin length 150 is measured along the axis 30 between the inner skin forward end 94 and the inner skin aft end 96. Each acoustic chamber 148 has an axial length 152; e.g., a maximum axial length. This acoustic chamber length 152 of FIG. 2 is measured between the bulkheads 88 and 90 at the outer skin 86, which acoustic chamber length 152 is also approximately equal to an axial length of the outer skin 86. The inner skin length 150 is sized greater than at least fifty percent (50%) of the acoustic chamber length 152; e.g., at least sixty percent (60%), seventy percent (70%) or eighty percent (80%) of the acoustic chamber length 152. The inner skin length 150 may even be equal to the acoustic chamber length 152 in some embodiments; e.g., see FIG. 7.

Referring still to FIG. 2, the inner skin 84 is angularly offset from the axis 30 by an angle. This angle is a non-zero acute angle. For example, in some embodiments, the angle may be less than twenty degrees (20°). In some embodiments, the angle may be between twenty degrees (20°) and forty degrees (40°). In some embodiments, the angle may be between forty degrees (40°) and sixty degrees (60°).

Each bulkhead is angularly offset from the axis 30 by an angle. This angle may be a non-zero acute angle or a right angle. For example, in some embodiments, the angle may be between thirty degrees (30°) and fifty degrees (50°). In some embodiments, the angle may be between fifty degrees (50°) and seventy degrees (70°). In some embodiments, the angle may be between seventy degrees (70°) and ninety degrees (90°); see also FIG. 7.

Figure 8:
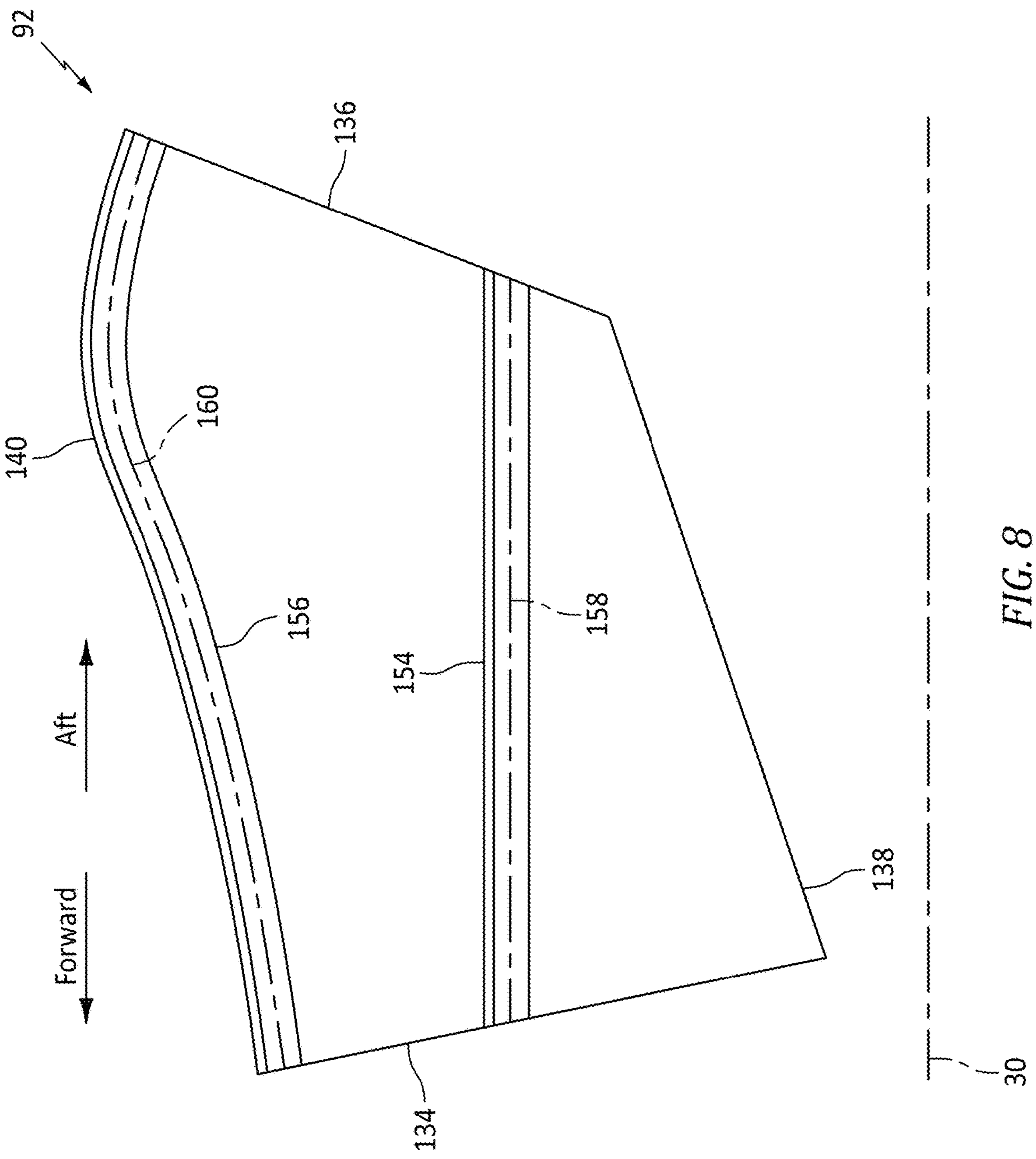
FIG. 8 is an illustration of a baffle with stiffeners.

In some embodiments, referring to FIG. 8, each baffle 92 may be configured with one or more stiffeners 154 and 156. Each stiffener 154, 156 of FIG. 8 is mounted to the respective baffle 92. Each stiffener 154, 156 extends longitudinally along a centerline 158, 160 of that stiffener 154, 156 and along the respective baffle 92. The centerline 158 of the inner stiffener 154 of FIG. 8 follows a straight trajectory, and the centerline 158 may be parallel with the axis 30. The centerline 160 of the outer stiffener 156 of FIG. 8 follows a non-straight trajectory; e.g., a curved, arcuate and/or splined trajectory. The outer stiffener 156 and its centerline 160 of FIG. 8, for example, follows a contour of the outer skin 86, and may be disposed at the baffle outer side 140.

The exhaust center body 52 may be configured for various gas turbine engines other than the one described above. The exhaust center body 52, for example, may be included in a geared gas turbine engine where a geartrain connects one or more shafts to one or more rotors in a fan section, a compressor section and/or any other engine section. Alternatively, the exhaust center body 52 may be included in a direct drive gas turbine engine configured without a geartrain. The exhaust nozzle may be included in a gas turbine engine configured with a single spool, with two spools (e.g., see FIG. 1), or with more than two spools. The gas turbine engine may be configured as a turbofan engine, a turbojet engine, a propfan engine, a pusher fan engine or any other type of gas turbine engine with an exhaust nozzle. Furthermore, the present disclosure is not limited to aircraft propulsion system applications. The gas turbine engine, for example, may alternatively be configured as an auxiliary power unit (APU) for the aircraft. The present disclosure therefore is not limited to any particular types or configurations of gas turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:

an exhaust center body including an inner skin, a perforated outer skin, a first bulkhead, a second bulkhead and an acoustic chamber;

the inner skin extending circumferentially about an axis, the inner skin extending axially along the axis between and connected to the first bulkhead and the second bulkhead, the first bulkhead axially aft and downstream of the second bulkhead along the axis, and a radius from the axis to the inner skin decreasing continuously as the inner skin extends axially along the axis from the first bulkhead to the second bulkhead;

the perforated outer skin extending circumferentially about the inner skin, and the perforated outer skin extending axially along the axis between and connected to the first bulkhead and the second bulkhead; and the acoustic chamber extending axially uninterrupted within the exhaust center body between the first bulkhead and the second bulkhead, and the acoustic chamber extending radially within the exhaust center body between the inner skin and the perforated outer skin.

2. The assembly of claim 1, wherein the exhaust center body further include a tail cone; and the first bulkhead is axially between the second bulkhead and the tail cone along the axis.

3. The assembly of claim 1, wherein the inner skin comprises a frustoconical surface which forms an inner peripheral boundary of the acoustic chamber.

4. The assembly of claim 1, wherein the acoustic chamber has an axial length along the axis; and the inner skin has an axial length along the axis that is at least fifty percent of the axial length of the acoustic chamber.

5. The assembly of claim 1, wherein an axial distance between the first bulkhead and the second bulkhead changes as the acoustic chamber extends from the perforated outer skin to the inner skin.

6. The assembly of claim 1, wherein the first bulkhead comprises a frustoconical first surface which forms a first side peripheral boundary of the acoustic chamber.

7. The assembly of claim 1, wherein the second bulkhead comprises a frustoconical second surface which forms a second side peripheral boundary of the acoustic chamber.

8. The assembly of claim 1, wherein an inner end of the first bulkhead is located axially between an outer end of the first bulkhead and the inner skin along the axis; and an inner end of the second bulkhead is located axially between an outer end of the second bulkhead and the inner skin along the axis.

9. The assembly of claim 1, wherein the exhaust center body further includes a first baffle;

the first baffle extends radially between the inner skin and the perforated outer skin;

the first baffle extends axially between the first bulkhead and the second bulkhead; and the acoustic chamber extends circumferentially within the exhaust center body to the first baffle.

10. The assembly of claim 9, wherein the exhaust center body further includes a second baffle;

the second baffle extends radially between the inner skin and the perforated outer skin;

the second baffle extends axially between the first bulkhead and the second bulkhead; and the acoustic chamber extends circumferentially within the exhaust center body between the first baffle and the second baffle.

11. The assembly of claim 9, wherein the exhaust center body further includes a stiffener mounted to the first baffle; and the stiffener extends along the first baffle following a straight trajectory.

12. The assembly of claim 9, wherein the exhaust center body further includes a stiffener mounted to the first baffle; and the stiffener extends along the first baffle following a non-straight trajectory.

13. The assembly of claim 9, wherein at least one of an axial first end of the first baffle is connected to the first bulkhead by a first end bracket, and the first end bracket extends along at least eighty percent of a longitudinal length of the axial first end of the first baffle; or an axial second end of the first baffle is connected to the second bulkhead by a second end bracket, and the second end bracket extends along at least eighty percent of a longitudinal length of the axial second end of the first baffle.

14. The assembly of claim 9, wherein a radial inner side of the first baffle is connected to the inner skin by an inner side bracket; and the inner side bracket extends along at least eighty percent of a longitudinal length of the radial inner side of the first baffle.

15. The assembly of claim 1, wherein the second bulkhead includes a second bulkhead outer radial end and a second bulkhead inner radial end; and the second bulkhead inner radial end is axially aft and downstream of the second bulkhead outer radial end along the axis.

16. The assembly of claim 15, wherein the first bulkhead includes a first bulkhead outer radial end and a first bulkhead inner radial end; and the first bulkhead outer radial end is axially aft and downstream of the first bulkhead inner radial end along the axis.

17. The assembly of claim 1, wherein the first bulkhead includes a first bulkhead outer radial end and a first bulkhead inner radial end; and the first bulkhead outer radial end is axially aft and downstream of the first bulkhead inner radial end along the axis.

* * * * *